US012583683B2

(12) United States Patent
Mol et al.

(10) Patent No.: US 12,583,683 B2
(45) Date of Patent: Mar. 24, 2026

(54) METHOD OF MAKING POSITIVE DRIVE CONVEYOR BELT

(71) Applicants: Edward T. Mol, Marne, MI (US); Daniel Hendrickson, Cedar Springs, MI (US)

(72) Inventors: Edward T. Mol, Marne, MI (US); Daniel Hendrickson, Cedar Springs, MI (US)

( * ) Notice: Subject to any disclaimer, the term of this patent is extended or adjusted under 35 U.S.C. 154(b) by 145 days.

(21) Appl. No.: 18/217,502

(22) Filed: Jun. 30, 2023

(65) Prior Publication Data

US 2024/0051760 A1     Feb. 15, 2024

Related U.S. Application Data

(60) Provisional application No. 63/357,606, filed on Jun. 30, 2022.

(51) Int. Cl.
B65G 15/60 (2006.01)
B29D 29/06 (2006.01)
B33Y 80/00 (2015.01)

(52) U.S. Cl.
CPC ............. B65G 15/60 (2013.01); B29D 29/06 (2013.01); B33Y 80/00 (2014.12)

(58) Field of Classification Search
None
See application file for complete search history.

(56) References Cited

U.S. PATENT DOCUMENTS

| | | | | |
|---|---|---|---|---|
| 4,697,693 A | * | 10/1987 | Rajala | B65G 15/42 |
| | | | | 198/698 |
| 5,853,849 A | * | 12/1998 | Nishio | B32B 3/10 |
| | | | | 474/84 |
| 6,419,775 B1 | * | 7/2002 | Gibson | B32B 7/12 |
| | | | | 156/137 |
| 7,210,573 B2 | * | 5/2007 | Mol | B65G 15/42 |
| | | | | 474/152 |
| 7,681,717 B2 | * | 3/2010 | DeGroot | B65G 15/30 |
| | | | | 198/835 |

(Continued)

*Primary Examiner* — Kavel Singh
(74) *Attorney, Agent, or Firm* — Rohm & Monsanto, PLC

(57) ABSTRACT

A manufacturing process converts a standard flat belt conveyor belt into a new, positively driven, pitch differential belt. A strip of thermoplastic material having a physical characteristic, such as melting temperature, that differs from the physical characteristic of the thermoplastic material comprising the conveyor belt, is applied to the drive side of a commercially available conveyor belt and machined to create a plurality of teeth, or drive bars, of any desired geometry that is configured to engage with the with sprockets or drums of the drive mechanism on the conveyor. The strip and/or drive bars can also be made by additive manufacturing, such as by 3D printing. Two ends of the resulting belt segment are cut to length and spliced, preferably with finger joints, to make a continuous loop using an industry standard hot-plate vulcanizer with a custom fitting called an alignment mold. The melting temperature of the belt and the strip/teeth are chosen to be far enough apart so that the belt may be spliced without melting the teeth. The alignment mold is a silicon pad that has recesses shaped to conform to the geometry/pitch of teeth so that the teeth retain their integrity and shape during the splicing process.

16 Claims, 5 Drawing Sheets

(56) References Cited

U.S. PATENT DOCUMENTS

| | | | | |
|---|---|---|---|---|
| 7,810,637 | B2 * | 10/2010 | Gundlach | B65G 15/64 |
| | | | | 198/834 |
| 7,850,562 | B2 * | 12/2010 | DeGroot | B65G 15/26 |
| | | | | 198/779 |
| 9,242,801 | B2 * | 1/2016 | DeGroot | B65G 23/44 |
| 9,359,141 | B2 * | 6/2016 | DeGroot | B65G 23/06 |
| 9,676,555 | B2 * | 6/2017 | Siemer | F16G 1/16 |
| 10,457,003 | B2 * | 10/2019 | Steinert | F16G 3/10 |
| 10,766,704 | B2 * | 9/2020 | Knopp | B65G 15/42 |
| 12,234,097 | B2 * | 2/2025 | Scharr | B65G 15/34 |

* cited by examiner

METHOD OF MAKING POSITIVE DRIVE CONVEYOR BELT

RELATIONSHIP TO OTHER APPLICATION(S)

This application claims the benefit of the filing date of U.S. Provisional patent application Ser. No. 63/357,606 filed on Jun. 30, 2022, the disclosure of which is incorporated herein by reference.

BACKGROUND OF THE INVENTION

Field of the Invention

This invention relates generally to conveyor belts and, more particularly, to a method of making endless conveyor belts of the type used in positive drive arrangements wherein teeth, or drive bars, on the conveyor belt engage with sprockets on the conveyor to drive the conveyor belt forward.

Background of the Prior Art

Conveyor belts are commonly used in the transportation of loads from one location to another in various industries such as the automotive, agricultural, computer, electronic, food processing, pharmaceutical, chemical, bottling and canning, rock and stone and packaging industries. A conveyor belt system typically comprises a powered pulley, or drive pulley, or drive drum and an unpowered pulley, or idler pulley. The conveyor belt rotates around the pulleys, moving the belt and the load on the belt forward. Typically, this system relies on friction to transmit the forces from the driven drum to and through the belt producing motion to carry a product along the conveyor.

Many problems result from this type of friction drive system including slippage of the belt on the drums or pulleys. Consequently, even more tension must be applied to overcome this slippage which leads to the creation of even more strain. This strain on a conveyor resulting from the immense forces needed to impart enough friction between the belting and the drums is greater than the amount of load in the conveyor resulting from drag and gravity. Moreover, the amount of work required often leads to some twisting of the conveyor. Conveyor frames need to be quite robust to resist such strain. This twisting often causes a modest misalignment within the conveyor resulting in yet a further problem, that is, tracking the belt to run straight. These are significant problems as evidenced by the fact that whole industries have grown up around offering apparent solutions for the aforementioned problems.

These problems, and more, have resulted in many manufacturers seeking better solutions. One such solution was to introduce protuberances, such as drive bars, lugs, or teeth, on the bottom side of the conveyor belting. This solution was intended to, and indeed eliminates, or greatly reduces, the need for tension. The marketplace has seen the introduction of many such products, functioning successfully, in the last few decades starting with rigid, modular belting by Intralox LLC, USA, New Orleans, LA (herein "Intralox"), driven by sprockets like a chain. In this solution, each module, or row of rigid plastic belting, is staggered like brick work and held in place to the rows in front and behind by an interlocking pin. In this manner, the rigid modular belting is made flexible. See, U.S. Pat. No. 7,594,574.

Another example is the Intralox ThermoDrive brand belting which is a solid, thermoplastic belt with drive lugs that are configured to engage with a drive sprocket or pulley. This system drives off of one tooth at a time and uses a pitch differential between the somewhat elastic belt and its sprockets to allow for the inherent elasticity in the belting while still engaging a tooth to fully drive the belt and its load forward. See, U.S. Pat. No. 8,163,214.

Other belt types have utilized teeth or protuberances on the bottom side of a conveyor belt to prevent slippage while still imparting, by friction, the driving force necessary to propel the belt and product forward. Nevertheless, these types of systems still require belt tooth and sprocket engagement. These mechanisms usually also result in the reduction of tension needed for the successful motivation of the belt and load forward. Examples of such systems include Volta Belting Technologies (Pine Brook, NJ) SuperDrive brand positive drive belt, as well as timing belts. As evidence that this is the functional method of motivation, it is often observed that both the leading edge AND trailing edge of tooth and/or sprocket may sustain and exhibit significant wear over time due to the rubbing of the teeth in the sprocket as these protuberances hold the belting in the prescribed location.

The present invention utilizes the driving mechanism pioneered by the ThermoDrive conveyor system which eliminates the need for tension by embracing the concept of pitch differential. In addition, the present invention addresses some of the inherent limitations of the Thermo-Drive conveyor system that is evident during the attempt to install or implement this system as described hereinbelow. The ThermoDrive conveyor system is described in U.S. Pat. Nos. 8,163,214; 8,002,110; 7,594,574; 7,424,948; and 7,210,573, among others, the contents of which are incorporated herein by reference.

At the time of the introduction of the ThermoDrive conveyor system to the market, there were very few machines, if any, that could successfully splice one end of the belt to the other end allowing for, or resulting in, an endlessed belt. The ThermoDrive belt is composed of a thermoplastic resin such as a TPU (thermoplastic polyurethane) commonly found in the market. This means that it can be welded to itself with little or no degradation by applying heat and pressure. However, ThermoDrive conveyor belt users could not utilize a hot-plate vulcanizer, common in the marketplace and a technology known to belt fitters, because the belt teeth were in the way and would be damaged while in the vulcanizer resulting in a section of the belt without teeth, or with damaged teeth, that could not operate with or against the sprocket. Much work was done to provide a solution that would enable a belt fitter with skills typical for the industry to successfully perform this feat reliably and consistently.

Consequently, another system was developed and employed that utilized what is called butt welding. While not as well known as hot-plate vulcanizers, butt welders had been employed routinely to endless small round, or trapezoidal, profiles with a cross-section the size of a coin. In this process, a frame holds each end of the belt in near proximity to a hot blade, while heating both ends, and then clamps the ends together squishing out excess molten material. To adapt this process to weld a ThermoDrive belt, which may be over 48 inches wide, while keeping the drive teeth on required pitches, each end of the belt must be meticulously cut between teeth so that the one end of the belt can be welded to the other end of the belt when forced into contact. A little of the belt end is consumed during the welding process when the belt ends are moved into contact with the hot blade. To keep the drive teeth of the spliced belt on pitch, this amount must be known. Consequently, a belt end prepared for splicing must be ½ of a pitch in length plus half of the little bit consumed during splicing. This level of precision can be a problem since it requires a high level of competency and leads to failures when not calculated precisely.

In addition, such equipment is expensive and hard to justify as a purchase since the machine is dedicated to such a singular purpose and the need for such a machine is relatively infrequent. Furthermore, one manufacturer's butt splicing machine will typically not work for another manufacturer's belting. Each machine costs many thousands of dollars and a belt user cannot justify purchasing a machine for each belt type and so one is usually dependent upon one's supplier to install the belt. This can lead to yet another problem which is called "downtime" in the industry. Downtime is the time lost when a production line cannot be used to produce product due to some malfunction or unreadiness of a component. If the belt user must call for a supplier to splice each belt it is inevitable that some delay will occur and such delays can be expensive.

By contrast, the hot-plate vulcanizer is commonplace as nearly every belting supplier has one and so do many belt users. Such a machine can splice many different belt types, hundreds actually, merely by altering the protocol (heat, time, pressure) and/or by adding a fixture or two. These machines, designed and produced by many manufacturers, are very well known in the belting industry by suppliers and customers alike.

It is because of these limitations in the marketplace, amongst others, that we developed a system that can have the advantages of a positively driven belt utilizing pitch differential but overcoming the installation dilemma of requiring an expensive single-purpose tool to install each belt type by utilizing the ubiquitous hot-plate vulcanizer.

In addition, it has also become known in the industry that a "single pitch solution," a one-size-fits-all, approach to belting problems does not meet a significant portion of the industry's needs. Flat belt suppliers have long known this. Flat belting, such as the tensioned style belts discussed above, is offered in hundreds of styles of belting, with almost unlimited variations possible. What these all have in common is that they all run by friction.

The rigid plastic, modular belting, invented and developed by Intralox in the 1970s, introduced "positively driven belting" to the conveying world. It resolved splicing problems by allowing the user to simply slide a pin into its interlocking belt ends. No machinery was needed. Likewise, it resolved manufacturing costs and limitations by basing its fundamental concept on identical 6"×2" modules that could be bricklayed and pinned sequentially together, theoretically offering any length or width belt. Since modular belting's inception, hundreds of variants have been introduced but all are based on the rigid plastic module's small footprint. Every variant has hinges, every variant is made with rigid plastic, every variant is molded.

It still is evident that while modular belting can be supplied with great variety and requires no equipment to endless it as the pin used between each segment can also be used to connect two belt ends, at least one negative element is constant. All modular belting is hinged and therefore not free of discontinuities. These discontinuities can be problematic, particularly in the food industry, where cleanliness is important. Powders, liquids, pastes, and the like, can migrate to the hinged area and contaminate the hinged portion. As a result, the hinged areas can harbor bacteria and undesirable debris which impacts performance, hygiene, aesthetics, and more. Consequently, there is a demand for belting which is free of discontinuities and is positively driven. This demand has not been met in the industry by a belt that can also be spliced endless in a commonly known, readily accessible, and relatively inexpensive manner.

The flexible, positively driven belting market, on the other hand, including those utilizing pitch differential, has yet to have many variations available to it due to the aforementioned complications of splicing and manufacturing.

When a new variant of "pitch differential" belting is needed, the costs can be astronomical. This limits offerings from manufacturers of these belting types to mere handfuls of styles for countless and divergent needs. As of the present, Volta offers three styles of drive pitches, Intralox offers two, and the Megadyne Group (West Caldwell, NJ) offers one or so, and so on.

SUMMARY OF THE INVENTION

The present invention has been designed to address and solve these, among other, problems and needs in the industry. In accordance with an aspect of the present invention, we have developed a two-stage manufacturing process that converts any standard thermoplastic, or other polymeric, flat belt offering into a new, positively driven, pitch differential belt style. While others may manufacture the drive surface as part of the initial manufacturing process, whereby a whole roll of belting is made, our subsequent processing of the manufactured belting enables us to utilize many methodologies for making diverse types of belting offering a plethora of drive tooth possibilities, as well as other attachments. In essence, this second process can convert a standard flat belt offering into a new, positively driven, pitch differential belt style. Moreover, the design of a drive tooth and corresponding driving sprocket or drum can be rapidly developed for a specific need as it arises.

We can choose a different height, width, thickness, angle, shape, hardness, etc. for the drive device, which may be a sprocket, drum, or pulley, customized for nearly every application. While there are costs to doing this, when contrasted with exorbitant manufacturing costs, downtime costs and tooling costs, the total costs of our system are minimal, usually a few hundred dollars per type or style. We can offer thousands of variations on the driving surface alone. Flat belt customers have become accustomed to thousands of variations to the conveying surface of a belt but there are only a handful of variations on the driving or driven side. We are able to make thousands of possibilities available on both sides of the belt. At the present, few have even considered the option of doing this because a new splicing machine would be required for each drive variation. Further, our solution can be scaled up, or down, depending on market needs or demands.

It will be clear from the disclosure herein that our manufacturing techniques enables the application of any laterally-oriented features, or longitudinally-oriented features, to a commercially-available conveyor belt. These features are referred to generically as attachments herein and include, cleats or flights, for containment, as well as the protuberances referred to herein as teeth, lugs, or drive bars that engage with the drive elements in the conveyor system.

As will be described more completely hereinbelow, it is a particular advantage of the present invention that service and installation needs can be easily met using standard hot-plate vulcanizers with the addition of minor, inexpensive, custom fixturing.

In accordance with a method aspect of the invention, we have invented a method to attach at least one drive bar, and preferably a plurality of teeth (or drive bars), to the drive side of thermoplastic conveyor belts using a combination of technologies. This combination may employ an assortment of adhesive, heat welding and solvent welding technologies to do so. In a particularly preferred embodiment of the invention, a strip of polymeric material is attached to the underside (or drive side) of a pre-existing conveyor belt. Upon successful attachment of the strip, the drive bars are machined from the material in the attached strips, which may preferably be, a polyurethane strip. Again, the drive bars can be designed as simple teeth with a planar, angular, driving surface or as a complex 3D driving surface for engagement with the sprocket or drum. Each application can have its own unique, designed solution. In addition to the foregoing, the strip and/or drive bars can also be made by additive manufacturing, such as 3D printing, for example.

It is an advantageous feature of the invention that the teeth (or strip with teeth) are fabricated from a thermoplastic material that has different physical characteristics than the thermoplastic material comprising the belt. These different physical material characteristics include, the melting points, the stiffnesses, and the coefficients of friction, for example.

While the discussion herein mostly refers to thermoplastic materials, it is to be understood that the teeth (or strip with teeth) can also be made from non-melting materials, such as thermoset polymers, UV-curable epoxies, or even wood or metal.

In a preferred embodiment, which is particularly advantageous for the purpose of facilitating endlessing, that is, the joining of two ends of a length of belting to make a continuous loop, the belt and the teeth have mismatched melting characteristics. In this embodiment, the polymer comprising the belt and the polymer comprising the teeth have respective melting temperatures that are far enough apart so that the belt may be spliced without melting the teeth. Most preferably the teeth do not melt at the temperature required to splice the belt in a typical vulcanizer.

To enable the use of a hot-plate vulcanizer, we have created a mold that is substantially the inverse of the bottom, or drive surface, of the belt. This mold is referred to herein as an "alignment mold." The alignment mold is a fixture that allows the teeth on each belt end to be appropriately aligned in the vulcanizer to maintain pitch while successfully welding the belt ends together using a commonly known splice technique, such as a finger splice. The alignment molds are made for each specific embodiment, and often a new mold is made for each belt.

In order to retain integrity and shape, the polyurethane strips are composed of a TPU that melts at a temperature significantly higher and hotter than that required to splice the belting ends. Therefore, the drive bars fit into the mold and do not melt, degrade or deform during the splicing process. Thus, only one additional mold for the ubiquitous, hot-plate vulcanizer is necessary for the fitter to install successfully a positive drive conveyor belt in accordance with the present invention while utilizing skills and machinery commonly known in the industry.

In accordance with a further advantageous aspect of the present invention, the two ends of the belting are joined with a finger joint that has a unique geometry. In a finger joint, the two ends of the flat belting are cut to have fingers that intermesh with each other to strengthen the joint. Typically, the fingers have the same geometry all the way across the width of the belt. In accordance with this aspect off the invention, the geometry of the fingers are varied from large to small and back to large so that the fingers are smaller in the vicinity of the teeth. The fingers are varied in size, width, and length so that the fingers are short enough to fit between the teeth and large enough on the edges to create a strong joint. However, the aspect ratio of the fingers should remain the same throughout the splice since the aspect ratio of the finger has a direct effect on the strength of the bond.

In accordance with a method embodiment of the present invention, a two-stage manufacturing process converts many standard thermoplastic flat belt into a positive drive pitch differential belt. In the first stage, we start with a manufactured roll of thermoplastic belting and, in the second stage, we attach the teeth to an inner surface of the belting. In this manner, any belt carcass, including multilayer carcasses, such as carcasses including polyester film, can be made into a belt segment in accordance with the invention.

In a preferred embodiment, a strip of thermoplastic material is attached to the inner surface of the belt segment. The strip of thermoplastic material preferably has a melting temperature which is higher, and preferably 15° C. or more higher, than the melting temperature of the thermoplastic material comprising the belt carcass. The strip is attached to the base belt by heat, illustratively rf or resistance heating, hot air, friction, or solvent welding. Once the strip is adhered to the belt, the teeth are created on the strip, preferably by machining. In an alternate embodiment, the teeth can be printed using a 3D printer.

Of course, the teeth or lugs could be placed individually on the belt. However, the use of strips is more convenient for manufacturing. Moreover, if an individual lug comes off of the belt, it creates an absolute failure resulting in downtime. If a strip comes loose from the belt, it is a gradual failure which can be dealt with at a more convenient time. Once the teeth are attached to the belt, the belt segment, which is a cut-to-length portion of the belt, is then spliced to form an endless conveyor belt. The endlessing process of the present invention includes cutting fingers of a certain geometry in the two ends of the segments and joining the two ends, preferably with a standard hot-plate vulcanizer that is fitted with the alignment mold as described hereinbelow to ensure that teeth retains the proper pitch.

BRIEF DESCRIPTION OF THE DRAWING

Comprehension of the invention is facilitated by reading the following detailed description, in conjunction with the annexed drawing, in which.

DETAILED DESCRIPTION

Figure 1:
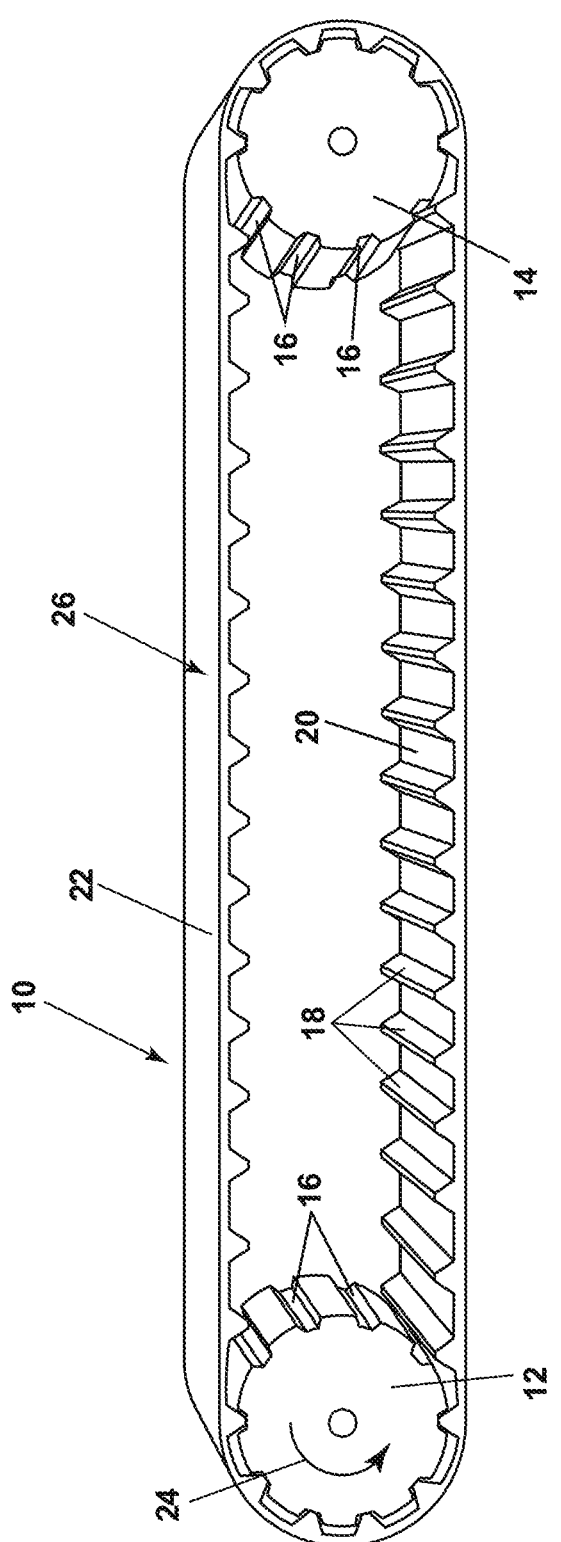
FIG. 1 is a perspective side view of an endless conveyor belt of the type used in positive drive arrangements wherein teeth on the underside, or inner surface, of a conveyor belt engage with sprockets.

FIG. 1 shows a conveyor belt 10 in a typical positive drive installation. In this case, conveyor belt 10 is an endless loop installed around two sprockets 12 and 14. The sprockets are conventional and can be of any size and configuration. Each sprocket 12, 14 has a number of transverse notches or grooves 16 spaced around its circumference. The sprockets 12, 14 can have any number of grooves 16, which may, in some embodiments, depend on the configuration of conveyor belt 10.

Conveyor belt 10, as shown in FIG. 1, has a plurality of teeth 18 spaced from each other on an inner surface 20 of conveyor belt 10. Inner surface 20 is the underside, or drive side of conveyor belt 10. The plurality of teeth 18 are configured to engage with grooves 16 of each sprocket 12, 14. At least one sprocket, illustratively sprocket 12, is a drive sprocket, while the other sprocket 14 may be an idler or slave sprocket. It is to be understood, however, that in any given installation there may be a plurality of sprockets for a single endless belt, at least one of which is a drive sprocket. Referring to FIG. 1, conveyor belt 10 travels in the direction of arrow 24 during operation.

The upper span 26 of conveyor belt 10 provides a carrying, or support, surface for the transport of items. Conveyor belt 10, therefore, has an outer surface 22 that is in contact with the goods being transported by the conveyor and an opposing inner surface 20. Outer surface 22 can be fairly smooth and free of discontinuities. In the alternative, outer surface 22 can be textured, or may have cleats, sidewalls, or other accessories not illustrated in FIG. 1, but known to those of skill in the art, depending on how conveyor belt 10 is to be used.

Figure 2:
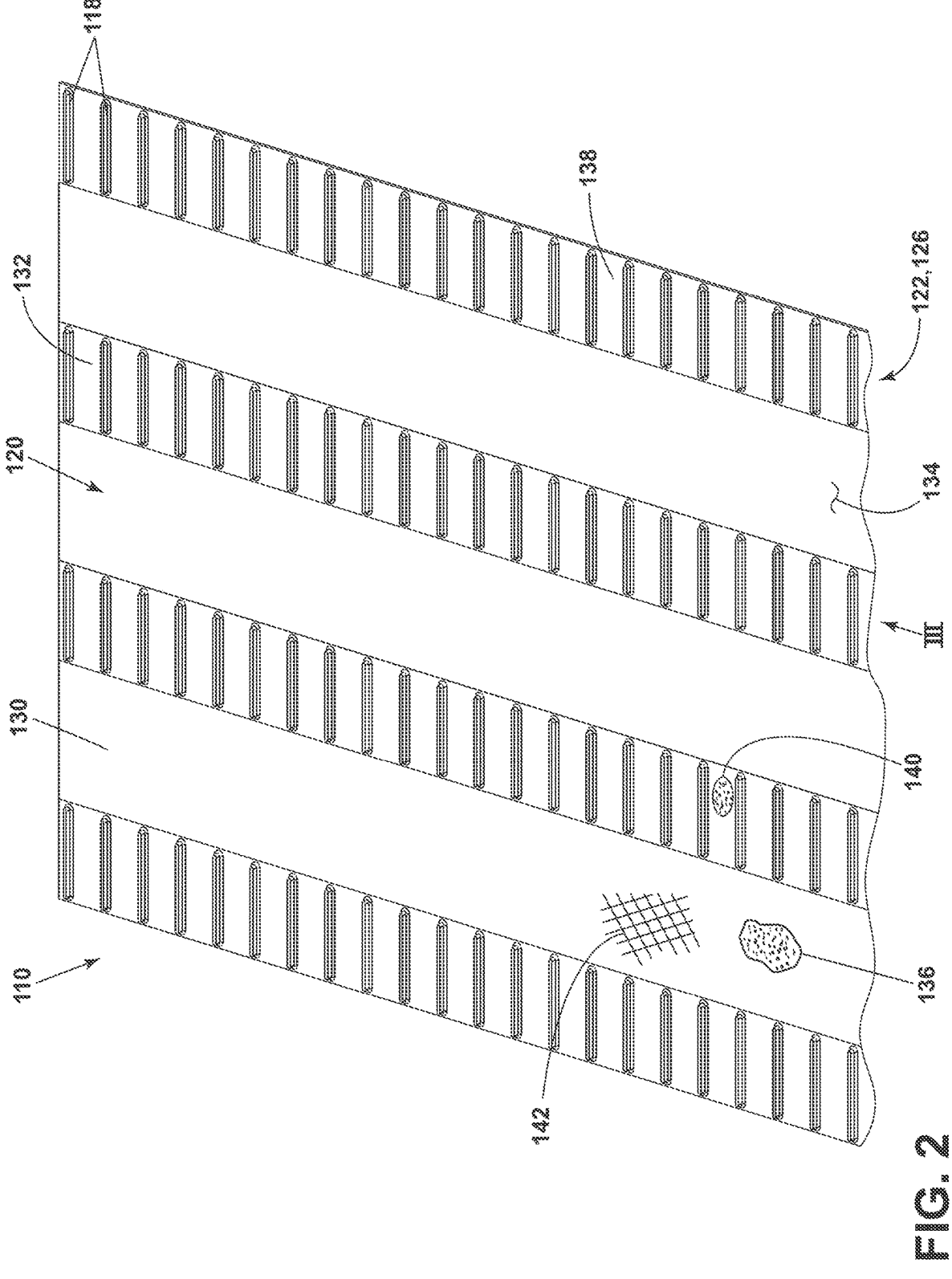
FIG. 2 is a perspective view of the inner, or drive, surface of a segment of and endless conveyor belt of the type shown in FIG. 1.

FIG. 2 illustrates a conveyor belt segment 110 according to an aspect of the disclosure herein. Conveyor belt segment 110 of FIG. 2 is substantially similar to a portion of the conveyor belt 10 shown in FIG. 1. Therefore, like parts will be identified with like numerals increased by 100. It should be understood that the description of the like parts of conveyor belt 10 applies to conveyor belt segment 110 unless otherwise noted.

Conveyor belt segment 110 is shown with the drive side, or inner surface 120, facing upwards. The conveyor belt segment 110, as shown in FIG. 2, has two main parts, a belt 130, which as discussed above, can be supplied by any manufacturer, and teeth 118 on the inner surface 120 of belt 130 that are configured to engage with a drive sprocket (not shown in this figure).

In a preferred embodiment, as shown in FIG. 2, teeth 118 comprises a plurality of teeth spaced equidistant from each other on strips 132 that run across the width of belt segment 110. Of course, the teeth can be spaced apart in any manner provided that the teeth are configured to engage with the sprockets used in the implementation. Belt 130 has an inner surface 134 defining at least a portion of the drive side, or inner surface 120, of conveyor belt segment 110 and an outer surface 122 that is in contact with the goods being transported on the upper span 126 of conveyor belt segment 110.

In accordance with the invention, belt 130 is formed of at least a first thermoplastic or thermoset material 136, which by way of a non-limiting example, is a urethane-based material. In a specific illustrative example, the first thermoplastic material is a polyvinyl chloride and urethane-based material. Other thermoplastic materials such as Pebax® resin, polyester or polyurethane, or any combination of thermoplastic materials or flexible thermoset materials, including rubbers, are contemplated in the practice of the invention.

The strip 132 of teeth 118 is mounted to belt 130 on inner surface 134. Strip 132 has a first side 137 (see, FIG. 3) in contact with the inner surface 134 of belt 130 and a second side 138 opposite to first side 137 that defines another portion of the drive side, or inner surface 120 of the conveyor belt segment 110. A plurality of teeth 118 extend from the second side 138. The strip may be mounted to the belt in any manner known to a person of skill in the art such as by the heating, gluing, or solvent welding. In a preferred method embodiment, an adhesive combined with a solvent is applied to the underside 137 of strip 132 which is then contacted with the belt surface 134. Heat is then applied to encourage the solvent to melt strip 132 to the belt. As illustrative examples, solvents such as cyclohexanone, toluene, acetone, tetrahydrofuran (THF) or methyl ethyl ketone (MEK) work well with polyurethanes.

Multiple strips, such as strip 132, each having a plurality of teeth 118, are typically attached to the inner surface 134 of belt 130. It should be understood that any number of strips 132 including only one can be mounted to the belt 130. By way of non-limiting example, four strips 132 are show in FIG. 2. Strip 132, including a plurality of teeth 118, is formed from a second thermoplastic or thermoset material 140. The second thermoplastic or thermoset material 140 can be, by way of non-limiting example, a urethane-based material. Other thermoplastic material possibilities include Pebax® resin, polyester or polyurethane, or any combination of thermoplastic or thermoset materials. However, the first and second thermoplastic or thermoset materials are chosen to have different physical characteristics as will be described hereinbelow.

Melting temperature is a preferred physical characteristic that dictates the selection of the first and second thermoplastics 136, 140. For example, the second thermoplastic material 140 has a higher melting temperature (T2) than the first thermoplastic material 136 comprising the belt. The melting temperature (T1) of the first thermoplastic material 136 is illustratively between 20° C. and 40° C. lower than the second thermoplastic material 140. In a specific preferred example, the second thermoplastic material 140 has a melting temperature (T2) that is at least about 15° C. higher than the first thermoplastic material 136.

Another differing physical characteristic is the hardness value. The second thermoplastic material 140 can have a higher hardness value than the first thermoplastic material 136. In other words, in this embodiment, the first thermoplastic material 136 is more flexible than the second thermoplastic material 140.

Yet another differing physical characteristic is the coefficient of friction for each of the surfaces defined by the first and second thermoplastics 136, 140. In a preferred embodiment, the first thermoplastic material 136, defining the outer surface 122 of the belt, has a higher coefficient of friction than the inner surface 134 of the belt to assist in gripping.

In a specific illustrative example, the first thermoplastic material 136 includes a fabric material 142 as a reinforcement in belt. The fabric material 142 can be, by way of non-limiting example, a polyester. The second thermoplastic material 140, which in some embodiments, defines the strip 132 with the second side 138 having a lower coefficient of friction than the outer surface 122. In other words, the inner surface 120 has an overall higher coefficient of friction than the outer surface 122 of the conveyor belt segment 110. It is further contemplated that the outer surface has a higher coefficient of friction than the first and second thermoplastic materials 136, 140. In other words, the outer surface 122 can include the fabric material 142 (FIG. 4) and have the highest coefficient of friction for the conveyor belt 110 ensuring a gripping surface.

Figure 3:
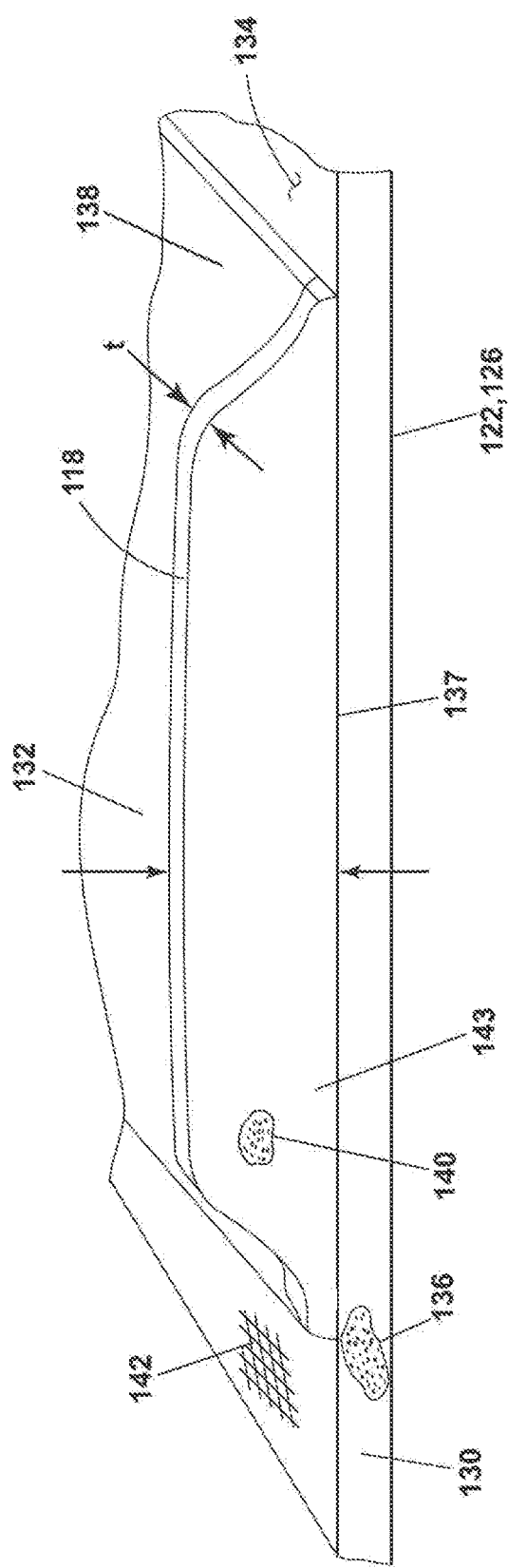
FIG. 3 is an enlarged view of an individual tooth as viewed from arrow III on FIG. 2.

FIG. 3 is an enlarged view of an individual tooth 118 of the plurality of teeth 118 as viewed from arrow III on FIG. 2. This figure shows more clearly that the first side 137 of the strip 132 is mounted to the inner surface 134 of belt 130. Each tooth of the plurality of teeth 118 has a height (H) measured perpendicular to the inner surface 134 of the belt and a thickness (t) measured parallel to the inner surface 34 of the belt. The height (H) and thickness (t) can vary depending on the implementation for the conveyor belt segment 110. In one embodiment, the strip 132 and the plurality of teeth 118 are one unit integrally formed from the second thermoplastic material 140. In another embodiment, there is no strip and each individual tooth in the plurality of teeth 118 is formed from the second thermoplastic material 140 and attached directly to the inner surface 134 of belt 130.

Figure 4:
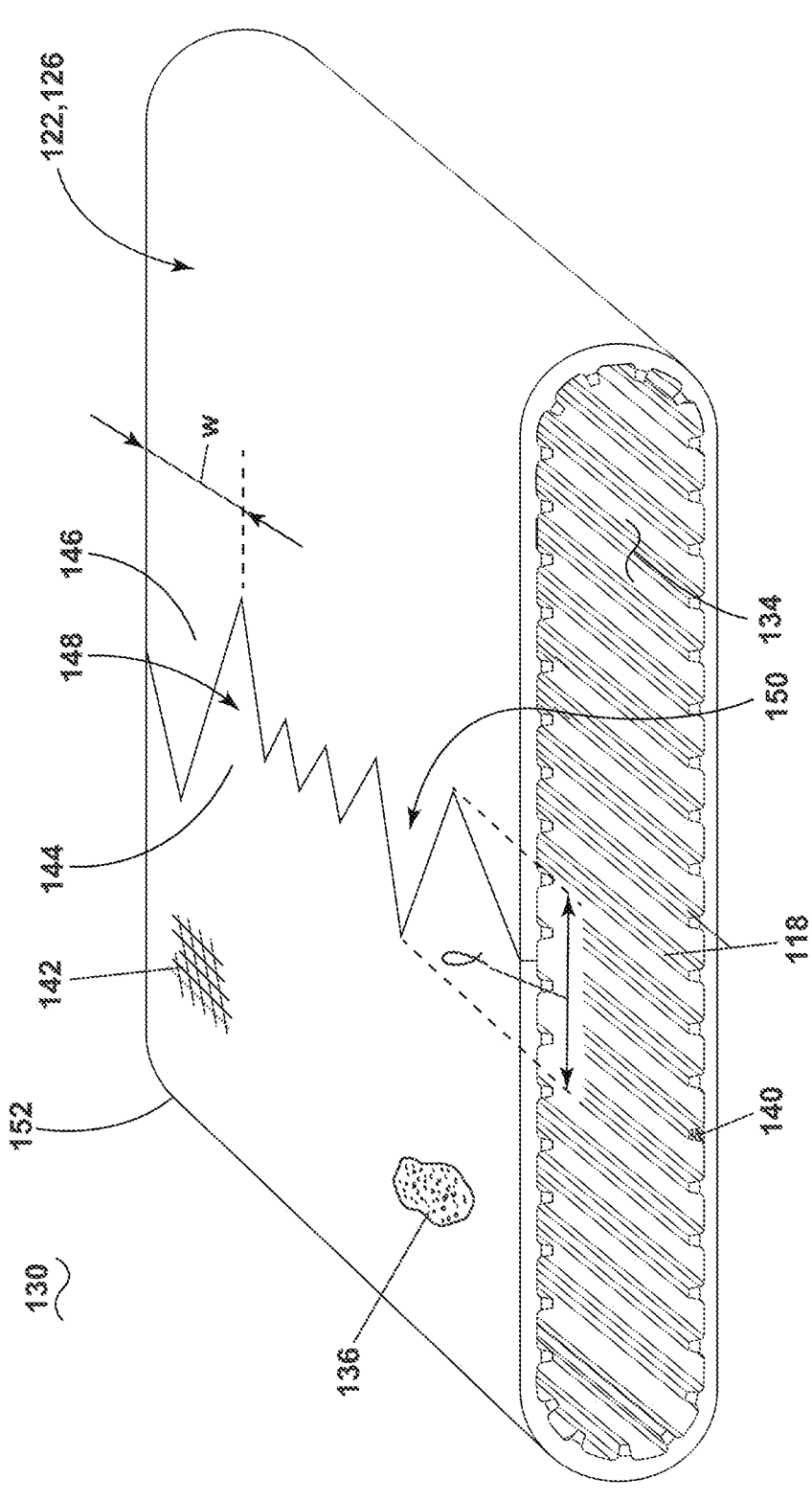
FIG. 4 is an enlarged perspective view of an endless conveyor belt manufactured in accordance with the method of the present invention.

FIG. 4 is an enlarged perspective view of an endless conveyor belt 130. The set of teeth 118 can extend to any width, including the entire extent of the width of the endless belt 130 (not clearly shown in this figure). In order to fabricate an endless belt, the two ends of a belt segment of the appropriate length must be joined together to form the endless loop. Referring to FIG. 4, belt 130 has a first end 144 and a second end 146. Instead of abutting two straight edges at ends 144, 146, it is advantageous to use a finger splice. This means that the first end 144 includes a first set of fingers 148 and the second end 146 includes a second set of fingers 150 that interlock. The fingers may be cut in any manner known in the practice of the art, illustratively the fingers are cut with a die by a hydraulic press punch or by computer numerical control (CNC) machine.

The first and second sets of fingers 148, 150 mirror each other such that the second set of fingers 150 is received in the first set of fingers 148 when the ends of belt 130 are joined. Each of the first and second sets of fingers 148, 150 can have a varying lengths (l) and widths (w) as illustrated in FIG. 4. The length (l) can range from of equal to, or between 0 and 5 inches, and the width (w) can range from of equal to, or between 0 and 1 inch, in a typical arrangement. The varying lengths (l) and width (w) enable a strong splice during manufacturing when the first end 144 is spliced with the second end 146 to define an endless conveyor belt 152.

Of course, the range of lengths and widths of the fingers can vary as is known to those of skill in the art. Moreover, the geometry of the fingers can vary. However, the pointed configuration shown in FIG. 4 is preferred. In a specific illustrative embodiment, the length (l) ranges from between 0 and 5 inches and the width (w) ranges from between 0 and 2 inches. In a particularly preferred embodiment, the lengths and/or widths of the fingers are greater in the vicinity of the belt where there are no teeth (see, FIG. 2, inner surface 134) and reduced in the vicinity of the belt where there are teeth (see, FIG. 2, strips 132) to fit within the pitch.

Figure 5:
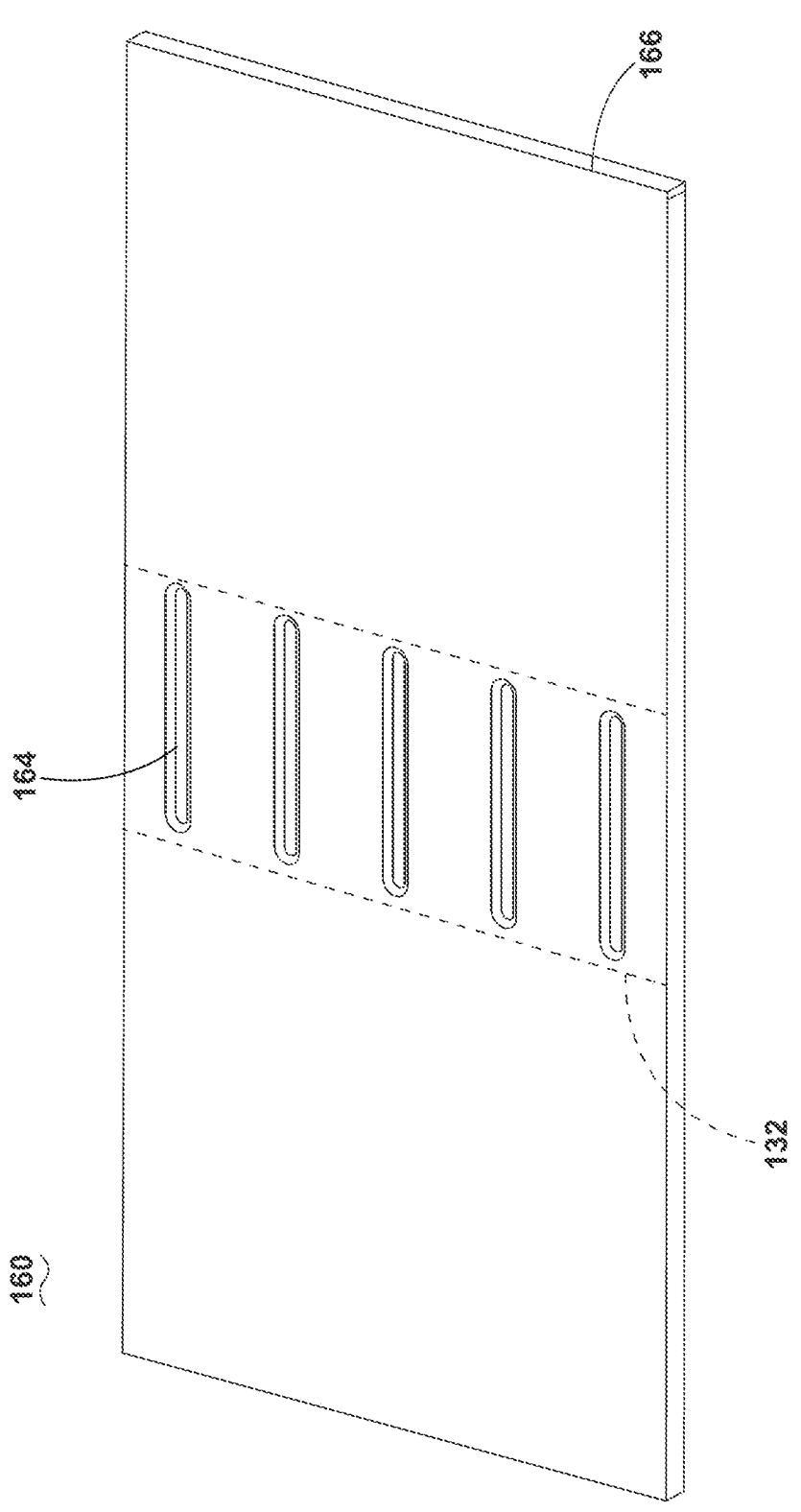
FIG. 5 is a perspective view of an alignment pad used to maintain pitch alignment during endlessing of a conveyor belt in accordance with the method of the present invention.

In a specific illustrative embodiment, the two ends 144, 146 are abutted so that the fingers 146, 148 intermesh in a standard hot-plate vulcanizer that is fitted with an alignment pad 160 as shown in FIG. 5 to ensure that teeth retain the proper pitch during the vulcanization process. It is known to use silicone pads in a vulcanizer to maintain the texture of the belt, particularly on the top surface, so that when the belt polymer becomes molten the surface texture can be customized to the customer's specifications. In accordance with the present invention, an alignment pad 160 is used on the bottom or drive surface of the belt during vulcanization to maintain the pitch of the teeth when the belt is melted to bond the ends.

Referring to FIG. 5, alignment pad 160, which preferably includes a block 166 of silicone, including at least one recess 164 which is configured to hold an individual tooth of the plurality of teeth 118 during the vulcanization process to splice the ends of the belt together. Recesses 164 are molded into the silicone or machined to conform to the geometry/pitch of teeth 118. As described herein, the plurality of teeth 118 can be part of a strip 132 illustrated in dashed lines on FIG. 5 (and as shown clearly in FIG. 2).

While the foregoing has been directed to laterally-oriented teeth, the manufacturing techniques of the present invention can be used to apply longitudinally-oriented features, or attachments, such as cleats or flights, that would be useful for containment to guide the belt along a desired path. These longitudinally-oriented features could be placed on the belt along the edges of the rows of teeth or centered within the row. The fabrication processes of the present invention enables the ability to make containment geometries, which can be negative or positive, of any desired shape and size and to locate them wherever desired.

As a specific example, a longitudinally-oriented feature can be made by reducing the height/removing the center of the row in order to capture a rail within the opening. Likewise, the outer edges of the row could be configured to be captured between two rails of the conveyor. In another example, the edges of the belt could contain an interlocking geometry that would allow positive engagement with the containment device. Such devices could be multi-purposed, that is, comprising support rails, sprockets, and frame members; or they could be dedicated instruments for the specific purpose of containment.

Although the invention has been described in terms of specific embodiments and applications, persons skilled in the art can, in light of this teaching, generate additional embodiments without exceeding the scope or departing from the spirit of the invention herein described. Accordingly, it is to be understood that the drawing and description in this disclosure are proffered to facilitate comprehension of the invention, and should not be construed to limit the scope thereof. Moreover, the technical effects and technical problems in the specification are exemplary and are not limiting. The embodiments described in the specification may have other technical effects and can solve other technical problems.

What is claimed is:

1. A method of making an endless positively driven, pitch differential conveyor belt of the type used in a conveyor wherein an endless conveyor belt has drive bars or teeth on the inner drive surface of the conveyor belt that are configured to engage with drive elements of the conveyor such as grooves in a drive sprocket, the method comprising the steps of:

cutting a conveyor belt having an outer surface and an inner drive surface to length to form a belt segment having two ends, the conveyor belt being formed from a first polymeric material;

forming at least one drive bar mounted to the inner drive surface of the conveyor belt, the at least one drive bar being formed from a second polymeric material having a melting temperature that is at least about 15° C. higher than the first polymeric material;

cutting the two ends of the belt segment to have fingers that are configured to intermesh with each other;

placing the two ends of the belt segment together so that the fingers intermesh on a standard hot-plate vulcanizer that has been fitted with an alignment mold to contact the inner drive surface of the conveyor belt, the alignment mold having a plurality of recesses shaped to conform to the geometry and pitch of the at least one drive bar on the belt segments so that the at least one drive bar is received in a recess of the alignment mold;

heating the two ends of the belt segment to a temperature greater than the melting temperature of the first polymeric material and less than the melting temperature of the second polymeric material while the alignment mold cradles the at least one drive bar to maintain its geometry and pitch; and cooling the two ends to form an endless conveyor belt.

2. The method of claim 1 wherein the alignment mold comprises a silicon pad that is substantially the inverse of the inner drive surface of the belt bearing the at least one drive bar so as to have a plurality of recesses.

3. The method of claim 1 wherein the geometry of the fingers is varied across the width of the belt.

4. The method of claim 3 wherein the geometry of the fingers varies from large to small and back to large so that the fingers are smaller in the vicinity of the at least one drive bar while retaining the same aspect ratio of length to width.

5. The method of claim 4 wherein the length of the fingers range from about 0 to 5 inches.

6. The method of claim 1 wherein the melting temperature of the first polymeric material is between 20° C. and 40° C. lower than the second polymeric material.

7. The method of claim 1 wherein the first polymeric material has a physical characteristic which is different from a physical characteristic of the second polymeric material.

8. The method of claim 7 wherein the physical characteristic is hardness and the first polymeric material has a higher hardness value than the second polymeric material.

9. The method of claim 7 wherein the physical characteristic is coefficient of friction and the first polymeric material has a higher coefficient of friction than the second polymeric material so that the outer surface has a higher coefficient of friction than the inner drive surface.

10. The method of claim 1 wherein the first polymeric material is a thermoplastic material.

11. The method of claim 10 wherein the second polymeric material is a thermoplastic material.

12. The method of claim 1 wherein the step of forming the at least one drive bar comprises securing the first side of at least one strip of the second polymeric material to the drive surface of the conveyor belt by adhesive, heat welding or solvent welding.

13. The method of claim 12 wherein the step of forming further comprises configuring the second side of the at least one strip of the second polymeric material to form teeth for engagement with a drive element of the conveyor by machining.

14. The method of claim 1 wherein the step of forming the at least one drive bar comprises applying at least one strip of the second polymeric material to the drive surface of the conveyor belt by additive manufacturing.

15. The method of claim 14 wherein the step of forming the at least one drive bar includes configuring teeth on the second side of the at least one strip of the second polymeric material for engagement with a drive element of the conveyor.

16. The method of claim 14 wherein the additive manufacturing is 3D printing.

* * * * *